(12) United States Patent
Haynes et al.

(10) Patent No.: US 11,892,200 B2
(45) Date of Patent: *Feb. 6, 2024

(54) FURNACE

(71) Applicant: Fire Chief Industries LLC, St. Louis, MO (US)

(72) Inventors: Danny N. Haynes, Byrnes Mill, MO (US); Gregory A. Miller, Chesterfield, MO (US)

(73) Assignee: FIRE CHIEF INDUSTRIES LLC, St. Louis, MO (US)

( * ) Notice: Subject to any disclaimer, the term of this patent is extended or adjusted under 35 U.S.C. 154(b) by 234 days.

This patent is subject to a terminal disclaimer.

(21) Appl. No.: 16/902,046

(22) Filed: Jun. 15, 2020

(65) Prior Publication Data

US 2020/0309415 A1  Oct. 1, 2020

Related U.S. Application Data

(63) Continuation of application No. 15/247,640, filed on Aug. 25, 2016, now Pat. No. 10,684,040.

(51) Int. Cl.
| | |
|---|---|
| F24H 9/20 | (2022.01) |
| F23L 9/06 | (2006.01) |
| F23L 13/02 | (2006.01) |
| F23L 9/02 | (2006.01) |
| F24B 5/02 | (2006.01) |
| F24H 3/06 | (2022.01) |
| F24B 7/04 | (2006.01) |
| F23L 15/00 | (2006.01) |
| F24D 5/00 | (2022.01) |
| F24H 3/00 | (2022.01) |

(Continued)

(52) U.S. Cl.
CPC .............. *F24H 9/2092* (2013.01); *F23L 9/02* (2013.01); *F23L 9/06* (2013.01); *F23L 13/02* (2013.01); *F23L 15/00* (2013.01); *F24B 5/026* (2013.01); *F24B 7/045* (2013.01); *F24D 5/00* (2013.01); *F24H 3/00* (2013.01); *F24H 3/067* (2013.01); *F23B 2700/023* (2013.01); *F24H 15/208* (2022.01); *F24H 15/345* (2022.01)

(58) Field of Classification Search
None
See application file for complete search history.

(56) References Cited

U.S. PATENT DOCUMENTS 4,018,209 A * 4/1977 Bonvicini ............... F24B 7/002
126/506
4,213,404 A * 7/1980 Spaulding ................ F24D 5/04
110/229

(Continued)

*Primary Examiner* — Steven B McAllister
*Assistant Examiner* — John E Bargero
(74) *Attorney, Agent, or Firm* — Crawford I.P. Law; David E. Crawford

(57) ABSTRACT

A furnace including a combustion chamber for burning fuel can have increased fuel burning efficiency, increased heating efficiency, and decreased harmful emissions of combustion byproducts. A combustion air delivery system delivers primary and secondary combustion air to the combustion chamber. Primary and secondary combustion air may be delivered at amounts that increase burning efficiency. An amount of secondary combustion air can be controlled by a valve system. A heat transfer device efficiently transfers heat from products of combustion for heating an enclosed space.

13 Claims, 13 Drawing Sheets

(51) Int. Cl.
    *F24H 15/345* (2022.01)
    *F24H 15/208* (2022.01)

(56) References Cited

U.S. PATENT DOCUMENTS

| | | | | |
|---|---|---|---|---|
| 4,832,000 | A * | 5/1989 | Lamppa | F24B 5/026 |
| | | | | 126/77 |
| 5,014,680 | A * | 5/1991 | Siemer | F23L 9/00 |
| | | | | 126/289 |
| 10,684,040 | B2 * | 6/2020 | Haynes | F24H 9/2092 |
| 2009/0151711 | A1 * | 6/2009 | Wells | F24B 7/025 |
| | | | | 126/523 |
| 2014/0311477 | A1 * | 10/2014 | Davenport | F24B 5/026 |
| | | | | 126/502 |

* cited by examiner

FURNACE

CROSS-REFERENCE TO RELATED APPLICATION

Applicant claims benefit of and priority to U.S. patent application Ser. No. 15/247,640, filed on Aug. 25, 2016, now U.S. Pat. No. 10,684,040, which is incorporated by reference herein in entirety.

FIELD

The present disclosure generally relates to a furnace, and more particularly to a furnace for heating an interior of an enclosure.

BACKGROUND

Furnaces or heaters are commonly used to heat fluid, such as air, circulated through a building to heat its interior. Some heaters burn solid fuel, such as wood or coal. The heaters generally include a firebox in which the fuel is burned. Air is circulated to and from the heater via a duct system generally including a cold air duct and a hot air duct communicating with the building interior. The furnace receives air from the building interior via the cold air duct. The air is heated as it flows over the firebox. The heated air is returned to the building interior via the hot air duct to heat the building interior.

Although conventional furnaces of this type work to heat the building interior, the furnaces may suffer from inefficiency in burning the fuel, inefficiency in transferring heat from the products of combustion to the building interior, and high emissions of undesirable combustion byproducts. Furnaces are commonly used for many years and can require maintenance and repair for long term durability and desired emissions performance. For example, furnaces with electronic controls can require maintenance to update or replace electronic components. Moreover, in the event of a power outage, the electronic control may become inoperable. Some furnaces may use a catalytic emissions reduction system. Such catalytic systems are prone to blockage and usually do not operate efficiently at low temperatures.

SUMMARY

One aspect of the present disclosure relates to a forced-air furnace for heating a space. The furnace includes a housing having a top, bottom, front, rear, and opposite sides. A firebox in the housing has a combustion chamber adapted for receiving fuel to be combusted for producing products of combustion. The furnace includes a combustion air delivery system for delivering combustion air to the combustion chamber. The combustion air delivery system includes a primary combustion air passage including a primary combustion air outlet in the combustion chamber for delivering primary combustion air to the combustion chamber. The combustion air delivery system includes a secondary combustion air passage including a secondary combustion air outlet positioned in the combustion chamber for delivering secondary combustion air to the combustion chamber. The combustion air delivery system includes a valve system in fluid communication with the secondary combustion air passage configured for changing the amount of secondary combustion air delivered to the combustion chamber in response to combustion chamber temperature.

In another aspect of the disclosure, a forced-air furnace for heating a space includes a housing having a top, bottom, front, rear, and opposite sides. A firebox in the housing has a combustion chamber adapted for receiving fuel to be combusted for producing products of combustion. A heat transfer device is above the firebox. A forced-air system includes a blower configured for moving air to the heat transfer device. The heat transfer device includes a post-combustion plenum having an inlet in fluid communication with the combustion chamber for receiving products of combustion therefrom and an exit for permitting products of combustion to exit the post combustion plenum. The post-combustion plenum has a first side, a second side opposite the first side, and a length extending therebetween. The heat transfer device includes heat transfer passaging downstream from the blower for receiving air from the blower to be heated by the post-combustion plenum. The heat transfer passaging includes at least one first passage portion extending lengthwise along the post-combustion plenum defining a flow path extending in a direction toward the first side of the post-combustion plenum. The heat transfer passaging includes a second passage portion downstream from the first passage portion. The second passage portion extends lengthwise along the post-combustion plenum and defines a flow path extending in a direction toward the second side of the post-combustion plenum.

In another aspect of the disclosure, a forced-air furnace for heating a space includes a housing having a top, bottom, front, rear, and opposite sides. A firebox in the housing has a combustion chamber adapted for receiving fuel to be combusted for producing products of combustion. The combustion chamber has an exit for permitting products of combustion to exit the combustion chamber. A combustion air delivery system is provided for delivering combustion air to the combustion chamber. The combustion air delivery system includes a primary combustion air passage including at least one primary combustion air outlet in the combustion chamber for delivering primary combustion air to the combustion chamber. The combustion air delivery system includes a secondary combustion air passage including a secondary combustion air outlet positioned in the combustion chamber for delivering secondary combustion air to the combustion chamber. The combustion chamber exit is positioned adjacent a first end of the combustion chamber. The primary combustion air outlet is positioned adjacent the first end of the combustion chamber lower than the combustion chamber exit. The primary combustion air outlet is configured for directing primary combustion air therefrom toward a second end of the combustion chamber opposite the first end.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
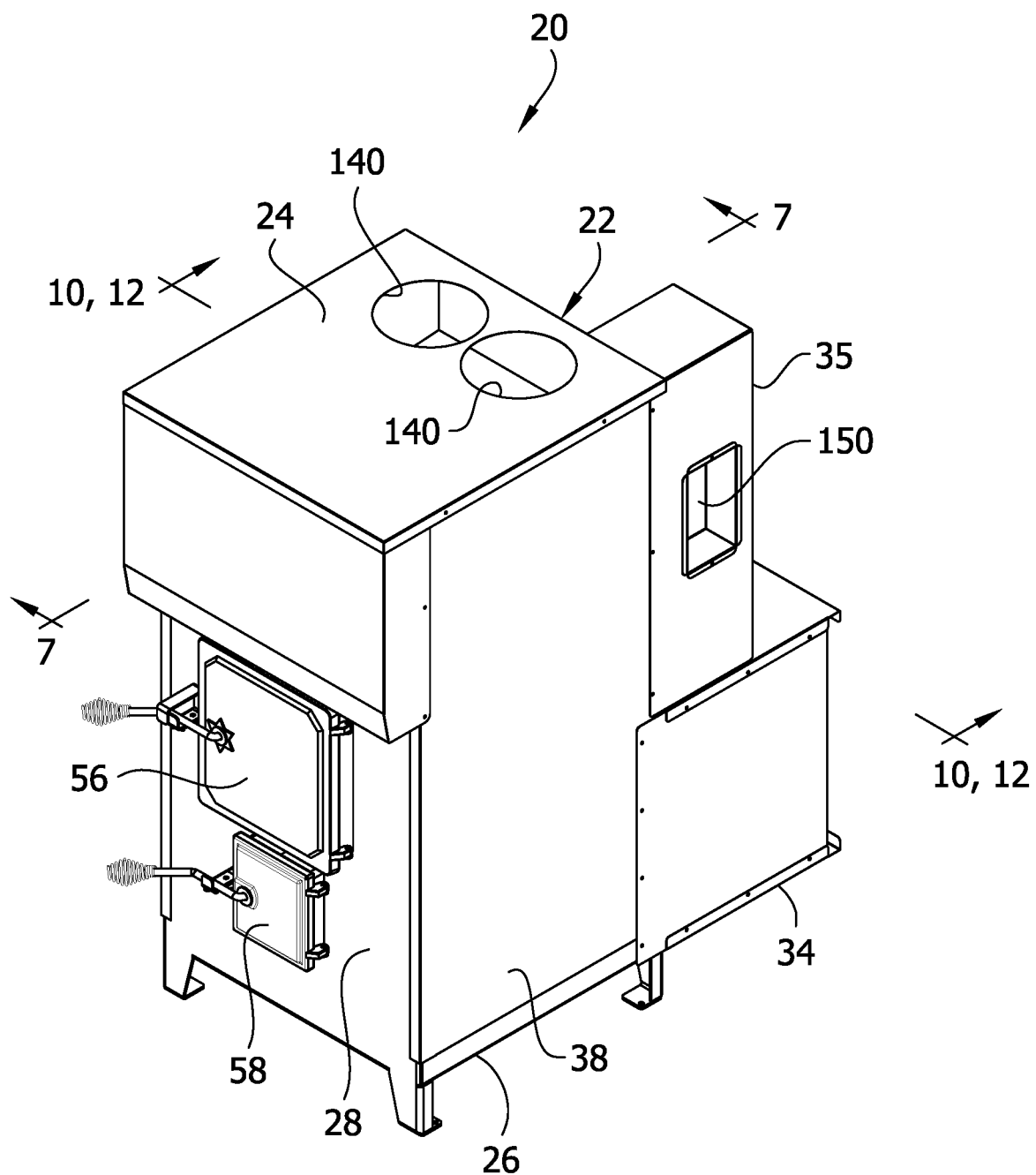
FIG. 1 is a front perspective of a furnace as described.

Referring to FIG. 1, a furnace or heater according to the present disclosure is designated generally by the reference number 20. The furnace 20 may be used to heat air (broadly, fluid) that is circulated in a space such as an interior of a building (not shown) to heat the space. The illustrated furnace 20 is an indoor, forced-air furnace configured for burning fuel such as wood. As described in further detail below, the furnace 20 automatically heats air and circulates the air to heat the interior of the building. As will be appreciated by those skilled in the art, aspects of the present disclosure can be adapted for use in other types of furnaces. For example, aspects of the disclosure can be used for outdoor furnaces, furnaces that burn other types of fuel, and furnaces that heat fluid other than air.

As will become apparent, the furnace has several features that improve the efficiency of the furnace and reduce harmful combustion by-product emissions. In general, the furnace is designed to achieve a relatively high efficiency and substantially complete burn of the fuel. After the complete burn, heat is efficiently transferred from the products of combustion to air to be delivered to the space to be heated. These and other aspects of the furnace will be described in further detail below.

Figure 2:
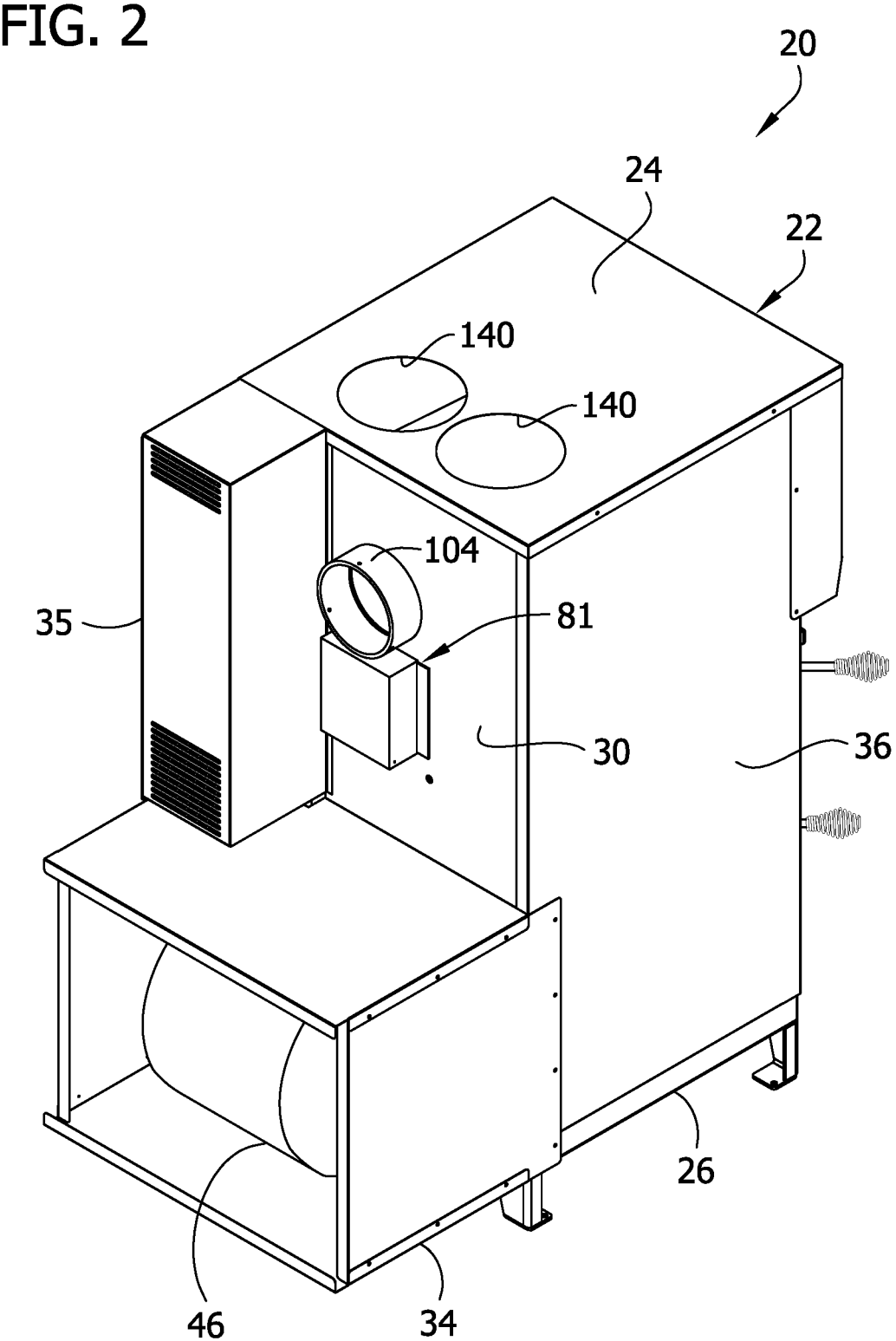
FIG. 2 is a rear perspective of the furnace of FIG. 1.
Figure 4:
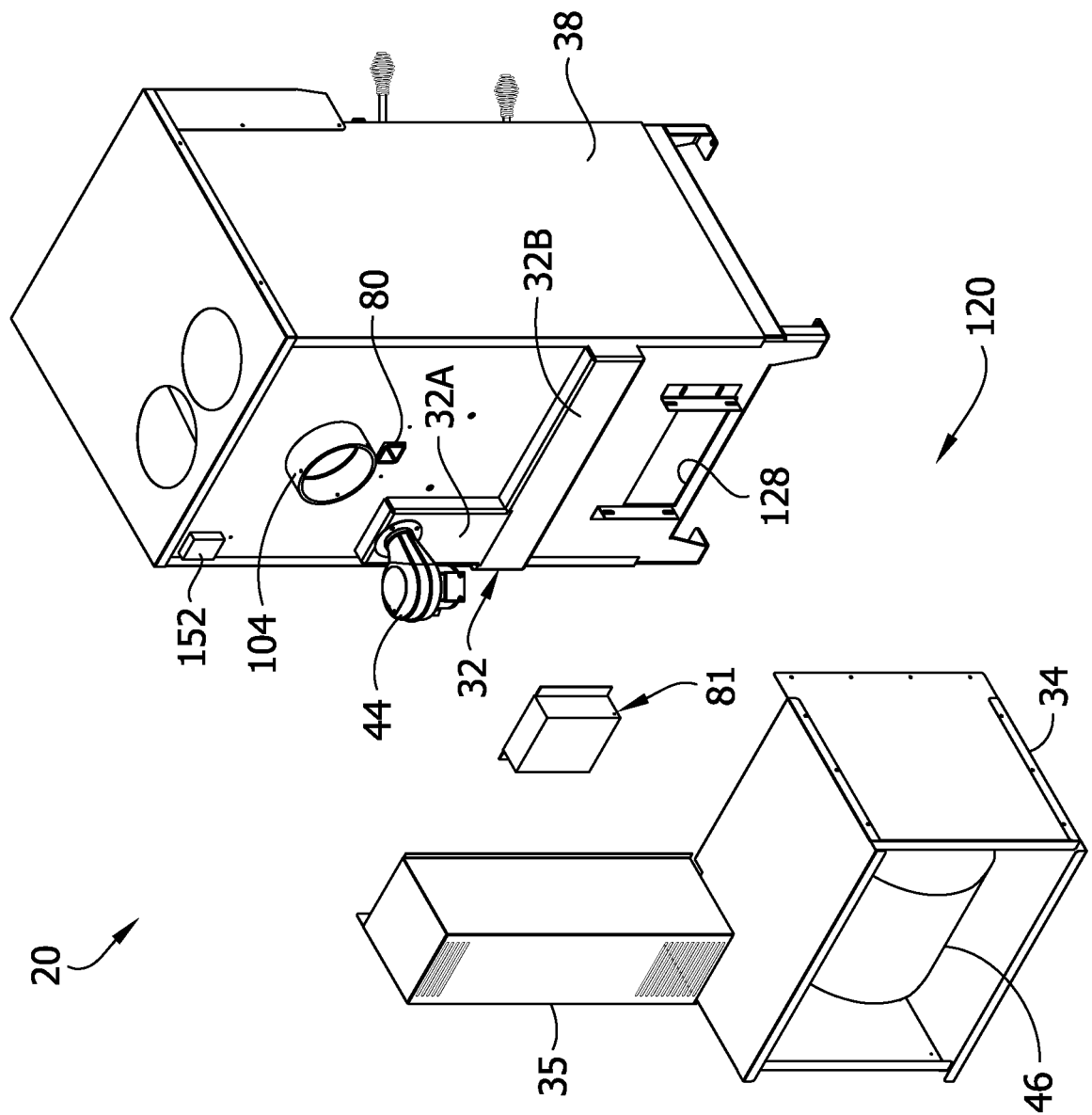
FIG. 4 is a rear perspective of the furnace partially separated.

Referring to FIGS. 1 and 2, the furnace 20 comprises a housing generally indicated at 22. The housing 22 includes a top defined in part by an upper wall 24 and a bottom defined in part by a lower wall 26 from which four legs extend to support the furnace 20 above a surface. The housing 22 includes a front defined in part by a front wall 28. The housing 22 has a back defined in part by a rear wall 30, a primary combustion air supply plenum 32 (FIG. 4), a blower housing 34, and a control housing 35. The housing 22 has left and right sides defined in part by left and right side walls 36, 38. The furnace walls are made of a suitable material such as heavy gauge steel and may be thermally insulated. Housings having other configurations and shapes can be used.

Figure 3:
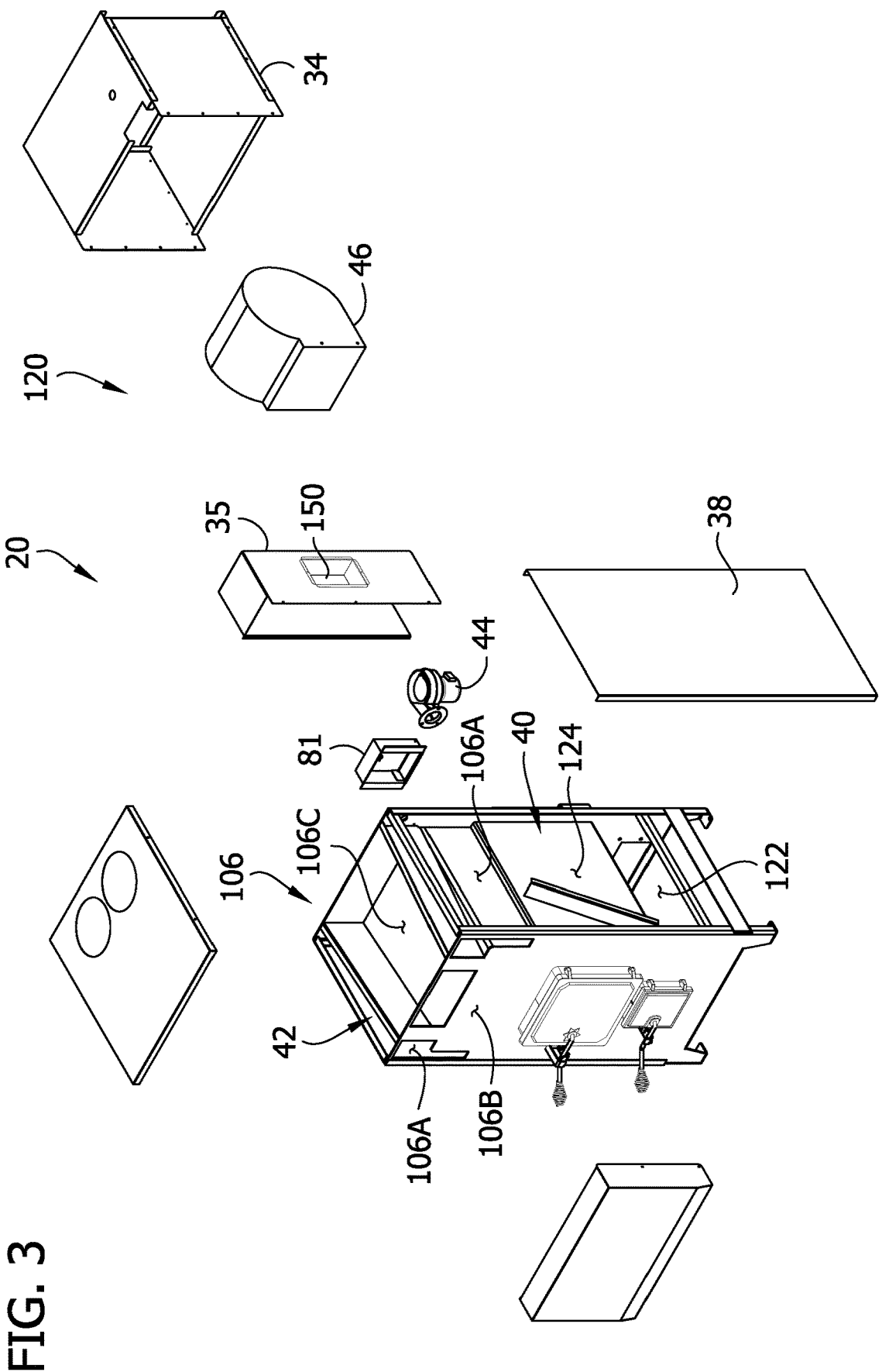
FIG. 3 is a front perspective of the furnace partially separated.

Referring to FIG. 3, the housing 22 has a hollow interior that houses a firebox generally designated by 40 in which fuel is burned, and a heat transfer device generally designated by 42 for transferring heat from products of combustion to the air delivered to the space to be heated. As explained in further detail below, a draft blower 44 delivers combustion air to the fire box 40, and a forced-air blower 46 within the blower housing 34 moves air through the heat transfer device 42 to heat the air for delivery to the space to be heated.

Figure 7:
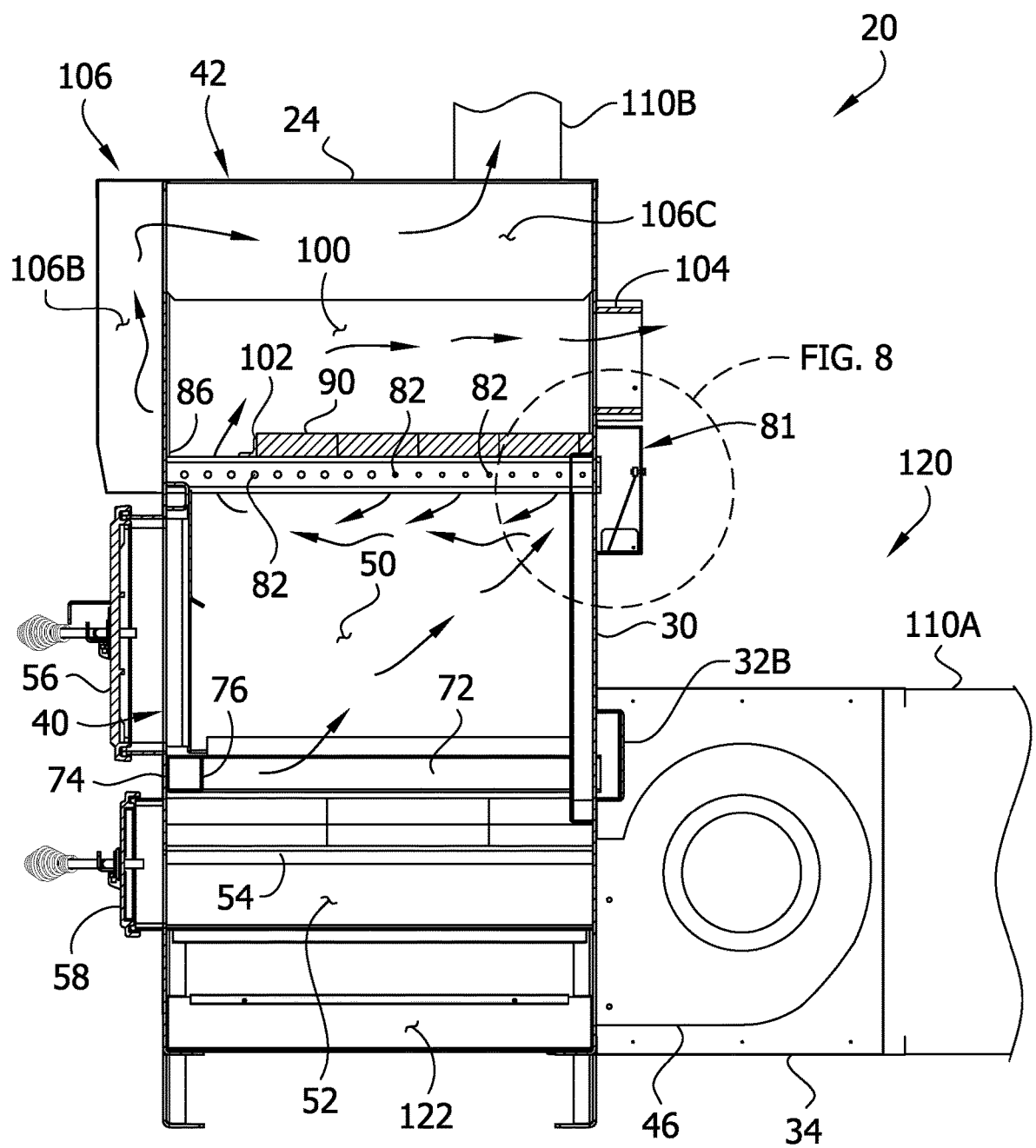
FIG. 7 is a cross section of the furnace taken in a plane including line 7-7 of FIG. 1.
Figure 10:
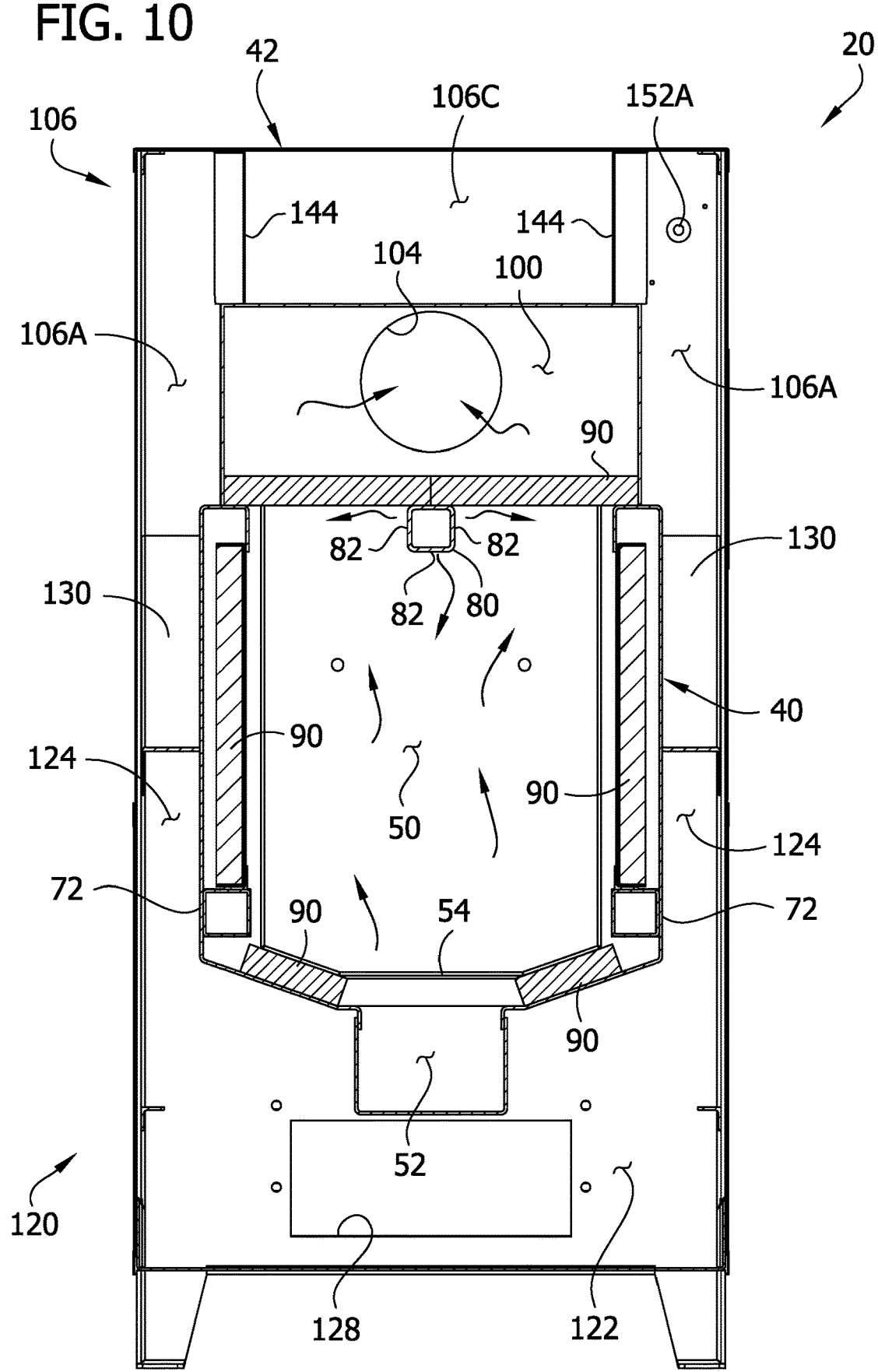
FIG. 10 is a cross section of the furnace taken in a plane including line 10-10 of FIG. 1.

As shown in FIGS. 7 and 10, the firebox 40 includes a combustion chamber 50 and an ash chamber or receptacle 52 below the combustion chamber. A suitable fuel support 54 (e.g., a grate) is provided in the combustion chamber 50 above the ash chamber 52 for supporting fuel such as wood in the combustion chamber. The combustion chamber 50 has a front adjacent the front of the housing 22, left and right sides adjacent the left and right sides of the housing, and a rear adjacent the rear of the housing. Fuel can be loaded into the combustion chamber 50 through a front opening that is normally closed by a fuel door 56. The combustion chamber 50 is sized to hold about 3.5 cubic feet of fuel (4.5 cubic feet of fuel in a larger version) surrounded by air for burning. It will be understood that the furnace with this combustion chamber capacity is suitable for heating a relatively large volume of space or spaces, such as the interior of several rooms, or an entire home or other building. Other sizes can be used. Ashes may be removed from the combustion chamber through an ash opening that is normally closed by an ash door 58. The combustion chamber 50 may be lined with fire brick or similar protective panels.

Figure 5:
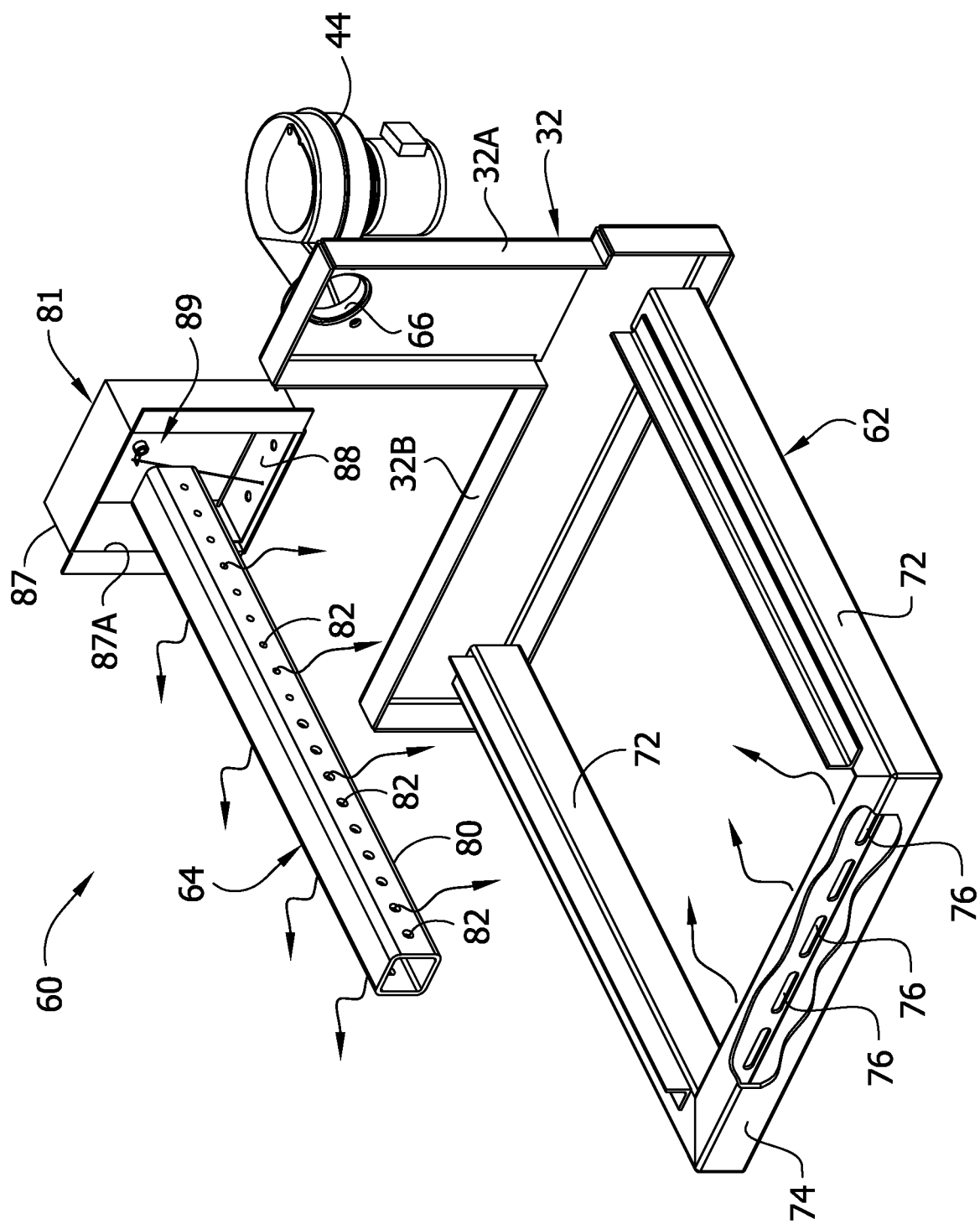
FIG. 5 is a front perspective of components of a combustion air delivery system of the furnace.

Fuel burning within the combustion chamber 50 is fed by oxygen delivered by a combustion air delivery system generally designated by 60 (FIG. 5), which will be described with reference to FIGS. 4-10. The combustion air delivery system 60 includes the draft blower 44, the primary combustion air supply plenum 32, and primary and secondary air passages for delivering primary and secondary combustion air to the combustion chamber, generally indicated by 62 and 64, respectively (FIG. 5). As will become apparent, the primary combustion air from the primary air passage 62 feeds primary combustion of the fuel, and the secondary combustion air from the secondary air passage 64 feeds secondary combustion for a cleaner, more complete burn.

The draft blower 44 is mounted on the primary combustion air supply plenum 32 such that an outlet of the blower overlies an inlet 66 of the plenum (FIG. 5). The plenum inlet 66 is a circular opening having a flow area of about 4.9 square inches (about 2.5 inches in diameter). In one example, the draft blower 44 may be designed to provide about 50 CFM of air flow. The draft blower 44 may be thermostatically controlled to operate in a forced draft mode and a natural draft mode, to automatically generate desired heat, as explained in further detail below. The primary combustion air supply plenum 32 has an L shape. In the illustrated embodiment, the primary combustion air supply plenum 32 is bounded by the rear wall 30 and an L-shaped housing portion mounted on the rear wall. Referring to FIG. 5, the plenum 32 includes an upper first portion 32A and a lower second portion 32B. The first portion 32A extends downward to the lower portion 32B, and the lower portion extends laterally toward opposite sides for feeding combustion air to the primary combustion air passage 62.

Still referring to FIG. 5, the primary combustion air passage 62 includes two ducts 72 on opposite sides of the firebox 40 and a front duct 74 adjacent the front of the combustion chamber 50 below the fuel opening. The side ducts 72 communicate with the lower portion of the combustion air supply plenum 32B and extend forward from opposite ends the plenum toward the front of the firebox 40 to opposite ends of the front duct 74. The side ducts 72 are connected to opposite ends of the front duct 74, which has a primary combustion air outlet 76. The ducts 72, 74 are exposed inside the combustion chamber 50 to preheat primary combustion air in the ducts. In one example, the ducts 72, 74 may be 2 inch square tubing having an internal flow area of about 3.5 square inches (1⅞ inches by 1⅞ inches).

Primary combustion air traveling in the primary combustion air passage 62 may be preheated to about 300 degrees F. before reaching the primary combustion air outlet 76. As shown in FIGS. 5 and 7, in the illustrated embodiment, the primary combustion air outlet 76 comprises a plurality of openings (also indicated by 76) spaced along the length of the rear side of the front duct 74. The primary combustion air feeds primary combustion of the fuel in the combustion chamber 50. Preheating the primary combustion air results in a more complete and cleaner primary burn of the fuel. Because the primary combustion air outlet 76 is positioned at a front of the combustion chamber 50, the fuel burns locally, beginning at the front of the combustion chamber and progressing to the rear of the combustion chamber. The fuel (e.g., wood logs) burning locally from the front to the back can be referred to as burning like a cigar. The lack of primary combustion air outlets other places than adjacent the front end of the combustion chamber cause the fuel to burn in this way. Ashes resulting from the burning fuel fall to the ash chamber 52. Other products of combustion, including heat, gases, and particulates, naturally rise in the combustion chamber 50.

To achieve a complete burn of the fuel, secondary combustion air is delivered to an upper portion of the combustion chamber 50 via the secondary combustion air passage 64. The secondary combustion air passage 64 includes a duct 80 extending downstream from a valve system 81. The duct 80 extends forward from the valve system 81 to the front of the combustion chamber 50. The duct 80 is exposed inside the combustion chamber 50 to preheat secondary combustion air in the duct. The preheated secondary combustion air is emitted to the combustion chamber 50 through a series of secondary combustion air openings 82 (referred to collectively as an "outlet"). Secondary combustion air traveling in the secondary combustion air passage 64 may be preheated to about 500 degrees F. before reaching the most distal opening 82. In the illustrated embodiment, the secondary combustion air openings 82 are spaced along each side of the duct 80 and along the bottom of the duct from the rear to the front of the combustion chamber 50. Desirably, the openings 82 are arranged to deliver a relatively uniform distribution of secondary combustion air along the length of the combustion chamber 50 between the front and rear of the combustion chamber. The openings 82 increase in size along the length of the duct 80 from the proximal (rear) end to the distal (forward) end of the duct. The openings 82 in the proximal half at the sides and bottom of the duct are about 0.25 inch in diameter, and the openings in the distal half at the sides and bottom of the duct are about 0.375 inch in diameter. The arrangement of the openings 82 and their diameters were determined by trial and error testing, to provide the most efficient burn characteristics. Other arrangements and sizes can be used without departing from the scope of the present disclosure. Desirably, the secondary combustion air causes combustible products remaining after primary combustion (e.g., carbon monoxide) to combust before exiting the combustion chamber 50. The preheated secondary combustion air assists in achieving a better secondary combustion, and the secondary combustion generally assists in achieving a cleaner, more complete burn of the fuel before the products of combustion leave the combustion chamber 50.

The combustion chamber 50 includes an exit 86 (FIG. 7) through which products of combustion exit the combustion chamber. The exit 86 is positioned adjacent the front of the combustion chamber 50 at the upper end of the combustion chamber, at the front end of the secondary combustion air duct 80. In the illustrated embodiment, the exit 86 is a relatively short duct having a width extending between the opposite sides of the fire box 40. Air exits the combustion chamber 50 via the exit 86 on the left and right sides of the secondary combustion air duct 80.

The configuration of the combustion air delivery system 60 and the arrangement of the outlets 76, 82 with respect to the exit 86 of the combustion chamber 50 is designed to provide a longer residence time for products of combustion in the combustion chamber and thus more time for secondary combustion to achieve a more complete burn. As illustrated by arrows in FIG. 7, primary combustion air is directed toward the rear of the combustion chamber 50. The primary combustion air outlet 76 is oriented to promote such air flow. The openings 76 on the rear wall of the duct 74 face rearward. As the fuel burns locally from front to rear, the products of combustion accumulate at a rear upper end of the combustion chamber 50. As the products of combustion move forward toward the combustion chamber exit 86, the products of combustion travel along the length of the secondary combustion outlet 82, subjecting the products of combustion to secondary combustion air for an extended time. Optimally, complete combustion is achieved by the time the products of combustion exit the combustion chamber 50.

In an aspect of the present disclosure, the combustion air delivery system 60 is configured to deliver variable flow of secondary combustion air to the combustion chamber 50. As will become apparent, the combustion air delivery system 60 is configured to independently control the amounts of primary and secondary combustion air delivered to the combustion chamber 50. As will be described in further detail below, ambient air supply to the secondary combustion air duct 80 is controlled by the valve system 81, which is actuated in response to temperature change. Air moves along the secondary combustion air duct 80 via natural draft. Regarding the primary combustion air, the draft blower 44 may be automatically cycled between a forced draft mode in which the draft blower is energized and actively forces air through the primary combustion air outlet 76, and a natural draft mode in which the blower 44 is de-energized but permits air to flow by natural draft through the primary combustion air outlet.

It has been determined that the amount of secondary combustion air should change based on temperature in the combustion chamber 50 to achieve an optimum level of secondary combustion. In one example, the amount of secondary combustion air required is about the same at a given combustion chamber temperature notwithstanding whether the draft blower 42 is energized or de-energized. As will become apparent, the combustion air delivery system 60, and in particular the valve system 81, is configured to provide combustion air in this fashion.

Figure 6:
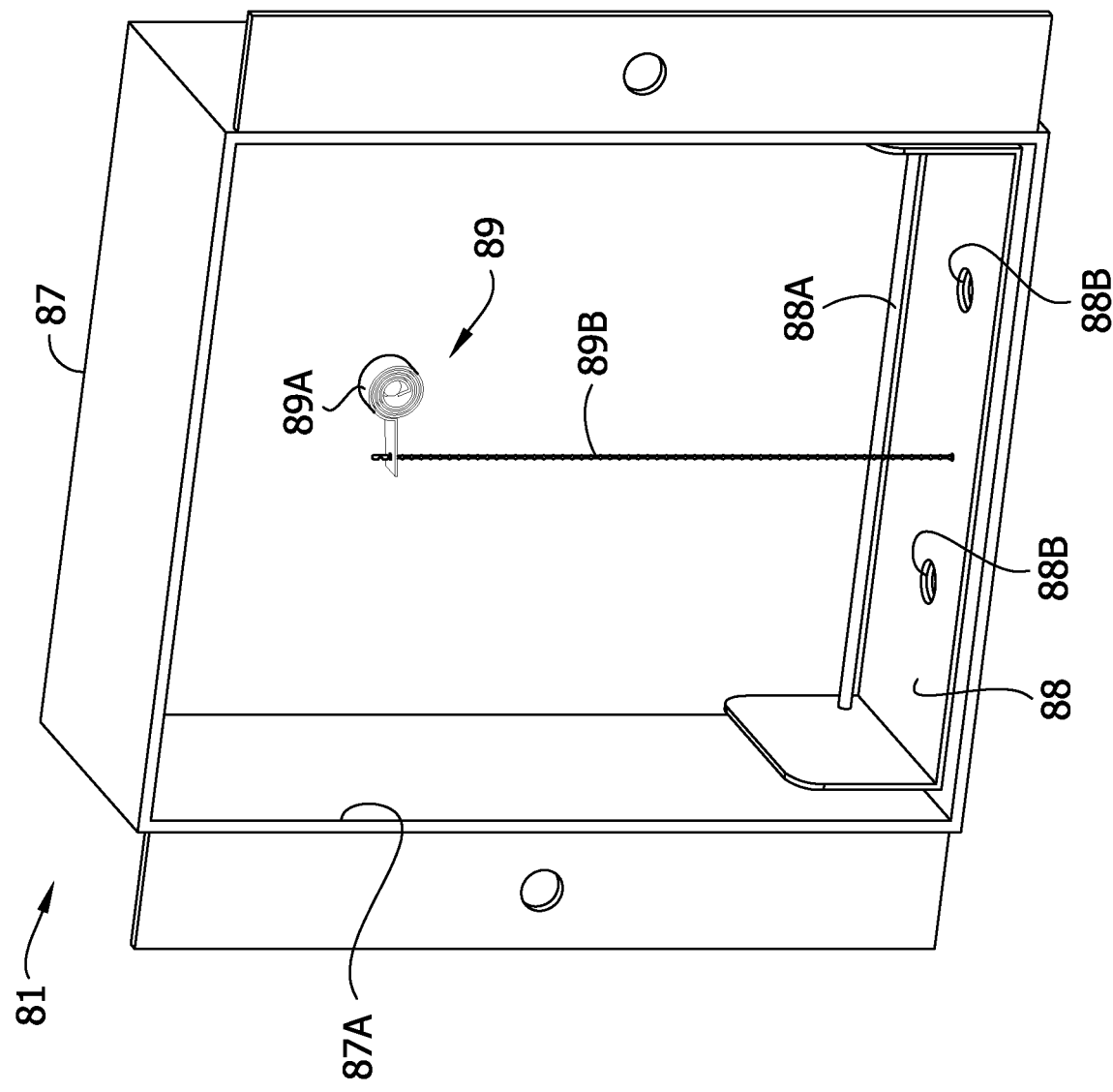
FIG. 6 is a front perspective of a valve of the combustion air delivery system of FIG. 5.
Figure 8:
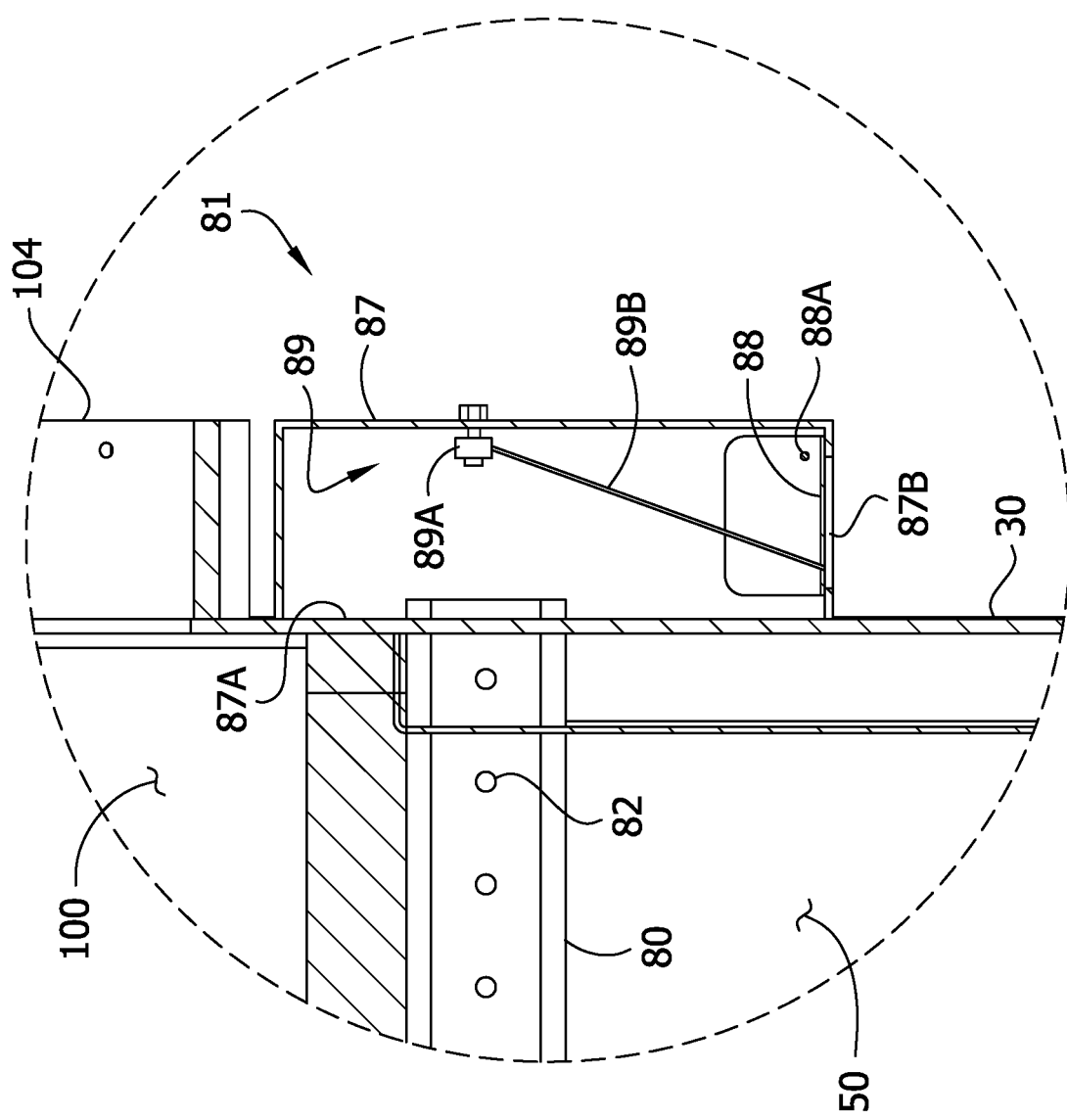
FIG. 8 is an enlarged fragmentary view of the section of FIG. 7, a valve member of the valve being shown in a closed position.
Figure 9:
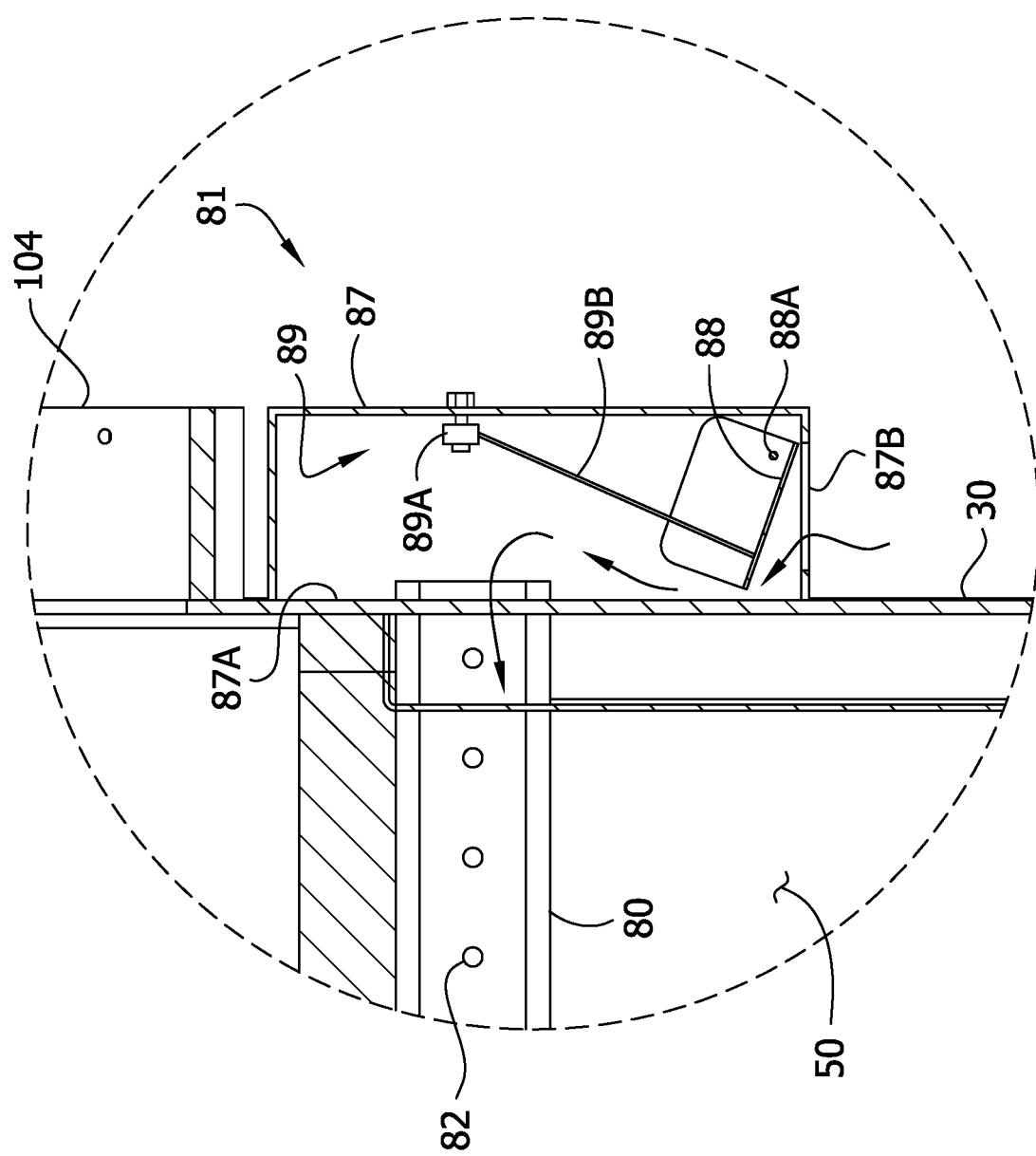
FIG. 9 is an enlarged fragmentary view similar to FIG. 8 but showing the valve member in an open position.

The valve system 81 will now be described in further detail with reference to FIGS. 5-9. The valve system 81 generally includes a valve housing 87, a valve member 88, and a temperature responsive valve actuator 89. In the illustrated embodiment, the valve housing 87 has a front outlet 87A mounted over the intake of the secondary combustion air passage 80 and has a bottom inlet 87B (FIGS. 8, 9) to permit flow of ambient air into the housing. The valve member 88 is provided in the form of a flap pivotally mounted on the valve housing 87 by a pin 88A. The flap 88 has two pilot openings 88B permitting ambient air to enter the valve housing 87 through the flap 88, for reasons explained below. The flap 88 is biased by gravity to rest on a lower wall of the valve housing 87 in a position covering the inlet 87B of the valve housing. As shown in FIG. 6, the temperature responsive valve actuator 89 includes a bi-metal member 89A and a chain 89B (broadly, a link) connecting the bi-metal member to the flap 88. The bi-metal member 89A has the shape of a coil and is sometimes referred to as a bi-metal spring or bi-metal coil. The bi-metal member 89A includes strips of two different types of metals, such as steel and copper, joined together along their length such as by brazing or welding. It will be appreciated that the bi-metal member 89A itself is a temperature sensor and an actuator. The bi-metal member 89A converts temperature change into mechanical displacement without need for an electronic control. Because of the different expansion properties of the metals of the bi-metal member 89A, the bi-metal member tends to deflect by uncoiling in response to increase in temperature. As a result, the bi-metal member 89A actuates the valve system 81 by pulling the chain 89B to cause the flap 88 to pivot from a closed position (e.g., as shown in FIGS. 5, 6, 8) to an open position (e.g., as shown in FIG. 9). If the bi-metal member 89A encounters a decrease in temperature, the bi-metal member tends to recoil and permits gravity to move the flap 88 toward the closed position. The bi-metal member 89A continuously monitors temperature and adjusts the position of the flap 88 by raising the flap in response to temperature increase and lowering the flap in response to temperature decrease. As a result, the amount of secondary combustion air delivered to the combustion chamber 50 changes based on temperature sensed by the bi-metal member 89A.

The temperature responsive valve actuator 89 is configured to indirectly sense temperature of the combustion chamber 50. More specifically, the temperature responsive valve actuator 89 is configured to indirectly sense temperature of the combustion chamber via radiation from the rear wall 30 of the housing 22 to which the valve housing 87 is mounted. The temperature responsive valve actuator 89 is also configured to indirectly sense temperature of the combustion chamber via conduction from the rear wall 30 of the housing through the valve housing 87 and support structure mounting the actuator to the valve housing (e.g., a fastener such as a screw or bolt). Alternatively, the temperature responsive valve actuator 89 could be configured to directly or indirectly sense the temperature of products of combustion downstream from the combustion chamber 50. For example, a sensor could be positioned in or on an exterior of a passage downstream from the combustion chamber 50. The illustrated bi-metal member 89A is outside the combustion chamber 50 and positioned to be out of the downstream flow of products of combustion from the combustion chamber 50. Because the bi-metal member 89A indirectly senses temperature of the combustion chamber 50, the bi-metal member actuates the valve member 88 less erratically. Directly sensing the temperature of the combustion chamber 50 might lead to sporadic actuation of the valve system 81 because the combustion chamber can experience relatively sharp temperature change spikes, such as when the draft blower 44 becomes energized. The indirect sensing provides a smoother valve actuation for less erratic change of secondary combustion air delivery.

Figure 13:
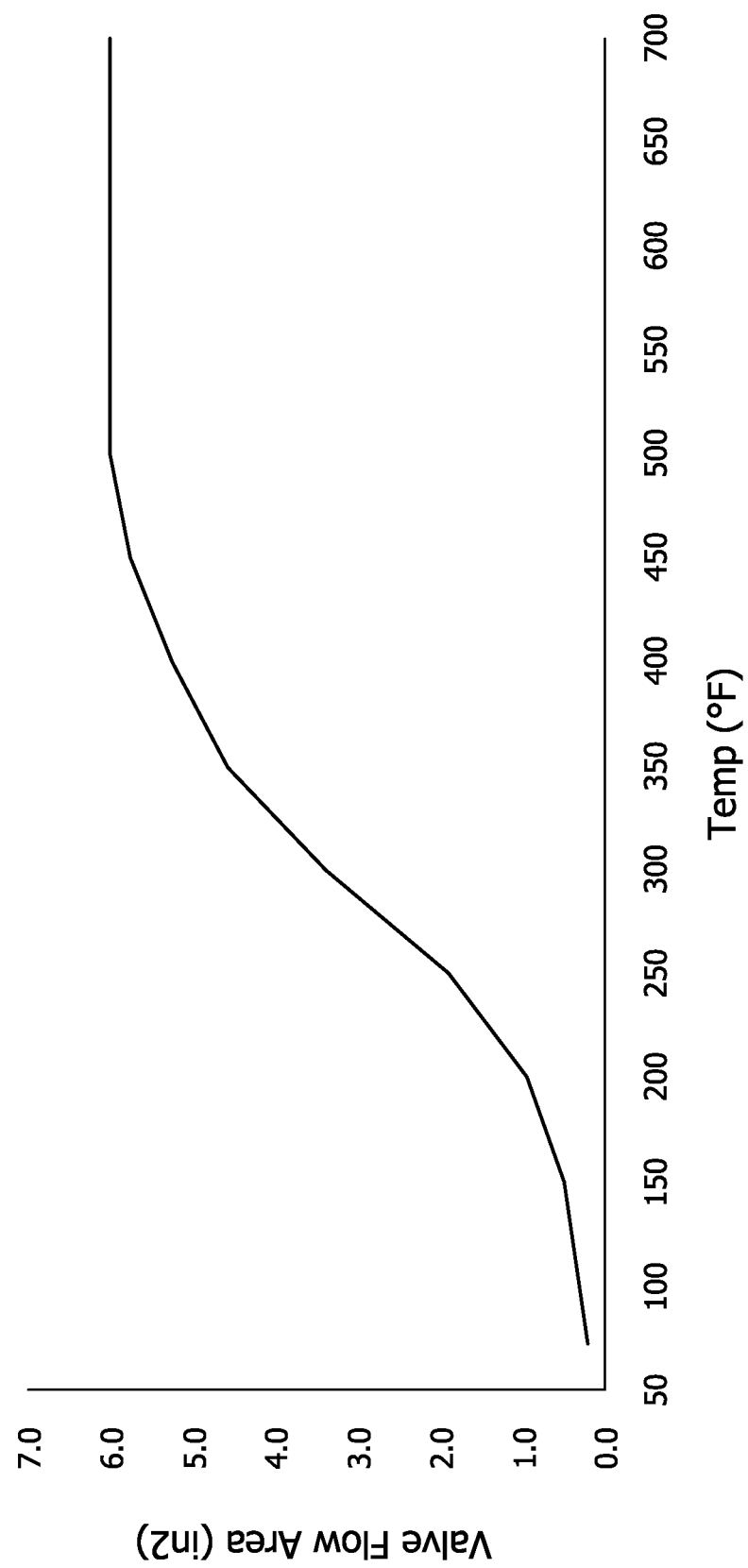
FIG. 13 is graph illustrating an example curve of flow area through the valve as a function of temperature.

A curve representing open flow area through the valve inlet 87B as a function of temperature sensed by the bi-metal member 89A is shown in FIG. 13. A table including values used to populate the graph is provided below. The Valve Flow Area values are estimated to represent the degree of openness of the valve 81 based on the position of the flap 88. It will be appreciated that when the draft bower 44 is energized, the temperature in the combustion chamber 50 will increase, and in response there will be increased secondary combustion air due to the increase in valve flow area. When the draft blower 44 is not energized, the temperature in the combustion chamber 50 will tend to decrease, and in response there will be decreased secondary combustion air due to the decrease in valve flow area. In general, an increase in temperature in the combustion chamber 50 is associated with increased products of combustion, which require increased secondary combustion air for a complete burn. As shown in the table below and the graph of FIG. 13, desirably there is still some valve flow area (e.g., about 0.2 square inches corresponding to the flow area of the pilot holes 88B in the flap 88) such that secondary combustion air is provided at a low level even when the temperature is low. This configuration is helpful for achieving a more complete burn (with secondary combustion air) when starting up the furnace 20 from a cold condition.

| Temp (° F.) | Valve Flow Area (in²) |
| --- | --- |
| 75 | 0.221 |
| 150 | 0.500 |
| 200 | 0.950 |
| 250 | 1.900 |
| 300 | 3.400 |
| 350 | 4.600 |
| 400 | 5.250 |
| 450 | 5.750 |
| 500 | 6.000 |
| 550 | 6.000 |
| 600 | 6.000 |
| 650 | 6.000 |
| 700 | 6.000 |

Accordingly, the combustion air delivery system 60 is configured such that, at the same combustion chamber temperature, the amount of secondary combustion air delivered to the combustion chamber 50 in the natural draft mode is about the same as the amount of secondary combustion air delivered to the combustion chamber in the forced draft mode. The amount of secondary air provided via the valve system 81 results in the most complete burn for the particular construction of the furnace. It will be appreciated that the amount of secondary combustion air needed to achieve a complete burn may vary by furnace design.

There are distinct advantages to achieving the desired amount of secondary combustion air and the desired ratio of secondary to primary combustion air by the structural design of the combustion air delivery system 60. In the illustrated embodiment, it is not necessary to provide electronic controls for adjusting the amount of secondary combustion air or tuning the secondary combustion air with respect to the primary combustion air. Achieving the desired level of secondary combustion air without electronic control increases furnace durability and reliability for the long term. The desired levels of primary and secondary combustion air are fixed and set at the factory, such as by the design of the valve system 81 and structural design of the various passages and inlets/outlets. Ease of use for the consumer is improved and maintenance is reduced because there are fewer electronically controlled components and fewer moving parts. In the event of a power failure, control of secondary combustion air is not lost (and emissions reduction is maintained) because the valve system 81 is not electronically controlled. Moreover, compared to a catalytic emissions reduction system, the valve system 81 is more effective at emissions reduction at lower combustion chamber temperature (e.g., when the draft blower 44 is idle), is less prone to blockage, and requires less maintenance. However, in some embodiments, an electronic control and/or a catalytic system can be used.

It will be understood that other combustion air delivery systems can be used without departing from the scope of the present disclosure. The various components can have other forms, and components can be omitted. For example, the primary combustion supply air plenum 32 and the primary and secondary combustion air passages 62, 64 may have other configurations. The primary and secondary combustion air outlets 76, 82 could include more or fewer openings (e.g., one), and the plenum inlet 66 could include more than one opening. Moreover, the valve system 81 could have other forms. It will be appreciated that the illustrated valve system 81 is shown by way of example and not limitation. For example, other types or arrangements of valve systems could be used including systems having other types of valve members (e.g., valve members made of multiple components and/or having more complex shapes). It will be appreciated that the bi-metal member 89A disclosed herein is both a sensor for sensing temperature and an actuator for moving the valve member 88. However, other temperature responsive valve actuators having physically separate temperature sensors and actuators (e.g., with the sensor positioned locally or remotely with respect to the actuator) can be used. Moreover, electronic controls can be used.

Another aspect of the furnace 20 that assists in achieving an efficient burn in the combustion chamber 50 is insulation 90 provided around the combustion chamber 50. As shown in FIGS. 7 and 10, insulation 90 is provided around the combustion chamber 50. For example, the insulation may comprise vermiculite, fire bricks, calcium silicate, and/or steel. One type of steel that can be used is stainless steel, which can withstand extreme combustion temperatures, provides good corrosion resistance, and maintains heat in the combustion chamber. The insulation 90 contains heat in the combustion chamber 50, and a hotter combustion chamber results in cleaner, more complete combustion. Accordingly, fewer harmful emissions are emitted from the furnace.

Figure 11:
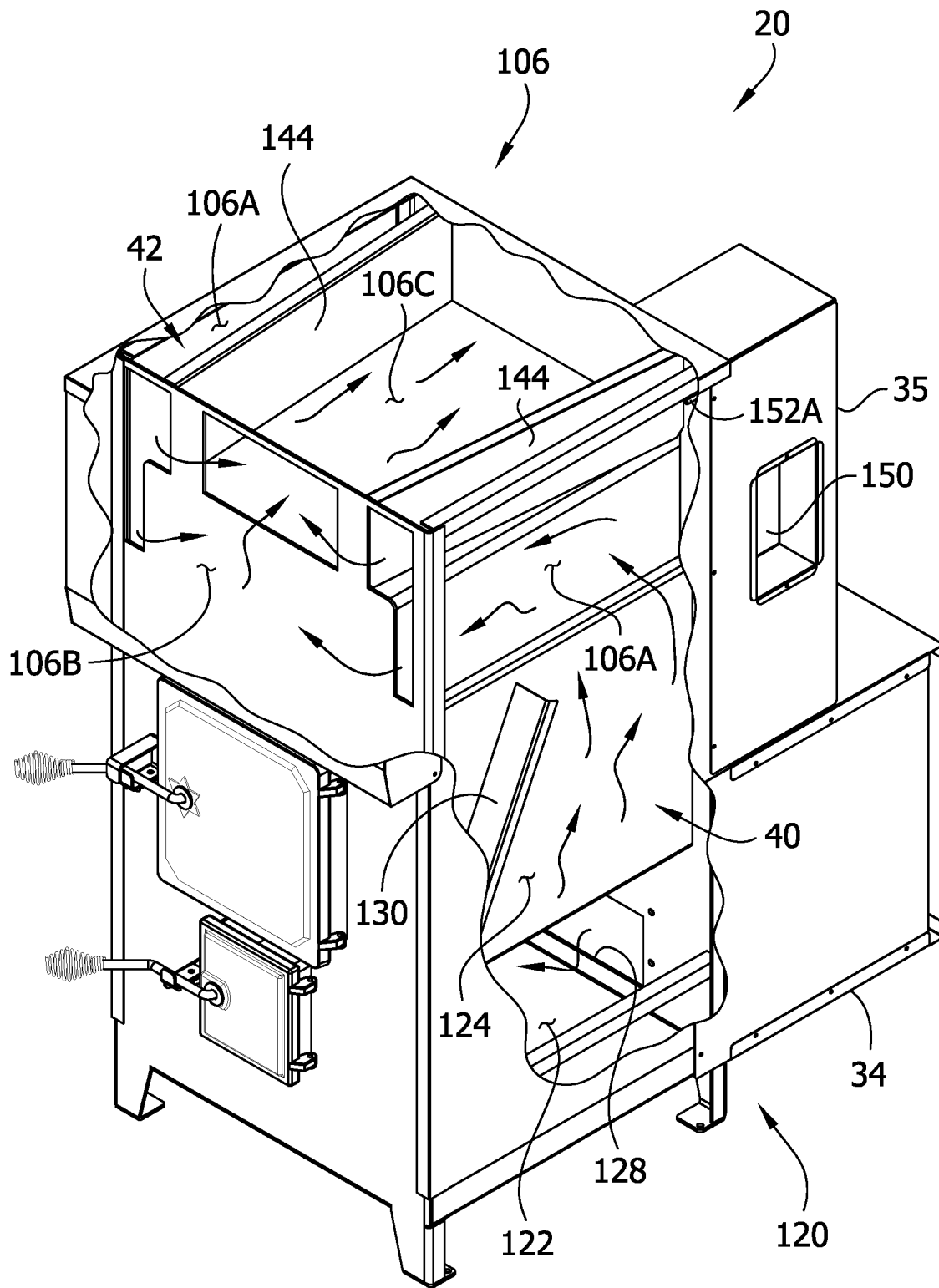
FIG. 11 is a front perspective of the furnace having portions of a furnace housing broken away to show internal components.
Figure 12:
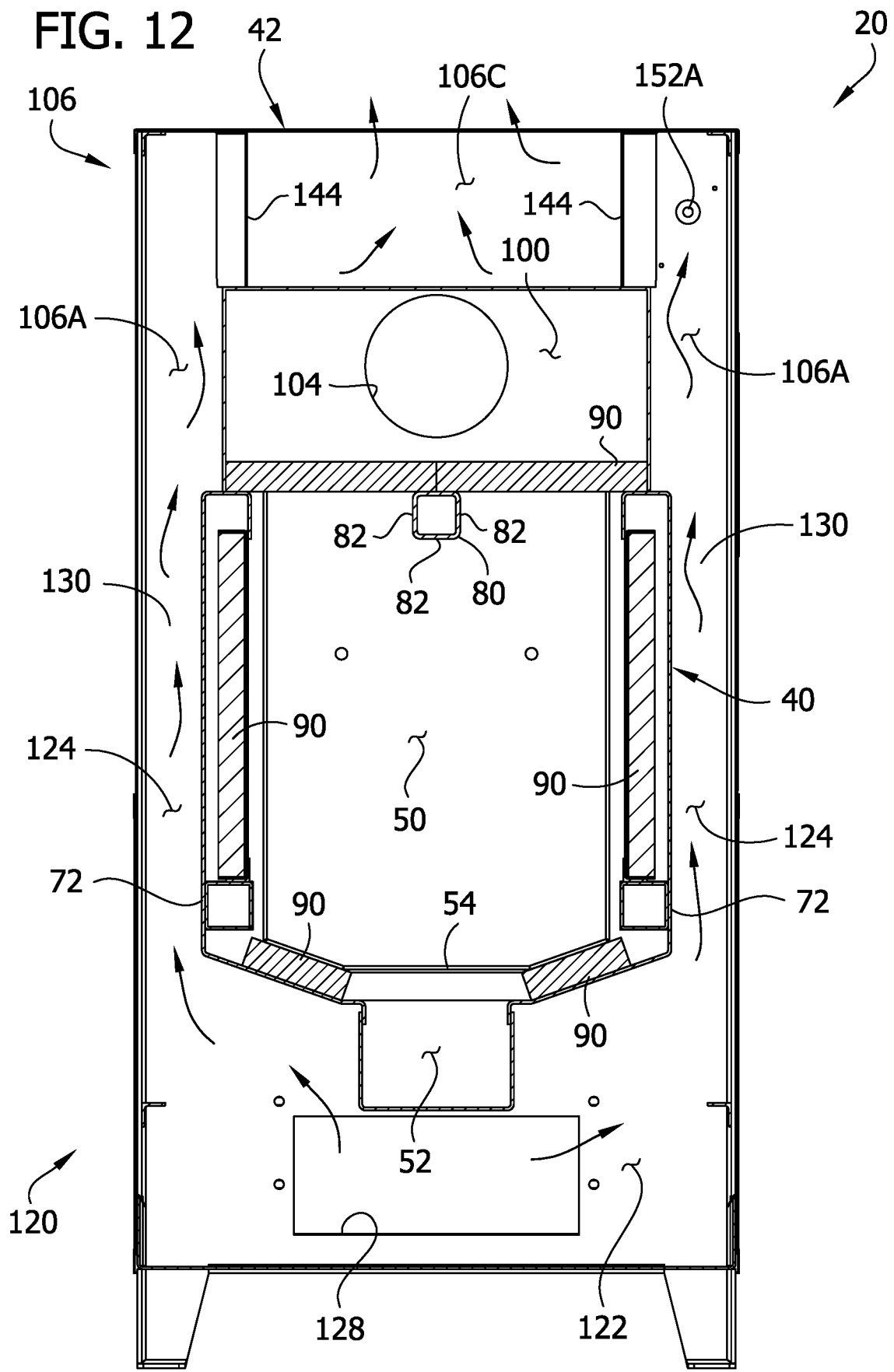
FIG. 12 is a cross section of the furnace taken in a plane including line 12-12 of FIG. 1.

Referring to FIGS. 10 and 11, the heat transfer device 42 is positioned above the combustion chamber 50 and includes a front adjacent the front of the housing 22, a rear adjacent the rear of the housing, and opposite sides adjacent the sides of the housing. The heat transfer device 42 is configured to efficiently transfer heat from the products of combustion to air delivered to the space for heating. The heat transfer device 42 is positioned downstream from the combustion chamber 50 so that heat is transferred from the products of combustion after a substantially complete burn in the combustion chamber. The heat transfer device 42 includes a post-combustion plenum 100 having an inlet 102 in fluid communication with the combustion chamber 50 for receiving products of combustion after combustion has occurred in the combustion chamber. The post-combustion plenum 100 has an exit 104 for permitting products of combustion to exit the plenum once heat is transferred to the air being delivered to the space being heated. Heat transfer passaging 106 extends around the post-combustion plenum 100 for transferring heat from the products of combustion to air to be heated, as will be described in further detail below.

The furnace 20 communicates with the space to be heated via a duct system, a portion of which is illustrated in FIG. 7. The duct system includes a cool air duct 110A (e.g., a cool air return), which supplies cool air to the heat transfer device 42, and at least one heated air duct 110B, which transports heated air to the space being heated. The furnace 20 has a forced-air system 120 that forces relatively cool air from the cool air duct 110A through the heat transfer device 42 and out through the heated air duct 110B. Duct systems having other configurations such as duct systems without a cool air duct, and systems having air inlets and outlets of other sizes and shapes can be used.

The forced-air system 120 moves air from the cool air duct 110A through the heat transfer device 42 to the heated air duct 110B. The system 120 includes the blower 46, a cool air plenum 122, and two ducts 124 upstream from the heat transfer device 42. Flow of air through the forced-air system 120 is illustrated by arrows in FIGS. 10 and 11. The cool air plenum 122 is in fluid communication with the blower housing 34 through a rectangular inlet 128 (e.g., having a flow area of about 60 square inches). The blower 46 blows air from the blower housing 34 through the inlet 128 into the cool air plenum 122 below the fire box 40. In the illustrated embodiment, the cool air plenum 122 has a length extending between the front and rear walls 28, 30 and a width extending between the left and right walls 36, 38. The cool air plenum 122 is in fluid communication with two ducts 124 positioned on the left and right sides of the firebox 40. The ducts 124 are defined by spaces between the firebox 40 and the left and right housing walls 36, 38. Vanes 130 in the ducts 124 (FIG. 11) direct air rearward in the ducts 124 as the air rises. The insulation 90 mounted on the sides of the combustion chamber 50 insulates the ducts 124 from the combustion chamber, so the combustion chamber is not cooled by the air. The ducts 124 lead to opposite sides of the heat transfer device 42.

The heat transfer device 42 will now be described in further detail with reference to FIG. 11. The heat transfer device 42 is configured to achieve efficient heat transfer from the products of combustion to the air flowing through the heat transfer passaging 106. The post-combustion plenum 100 directs the products of combustion along the length of the plenum from the inlet 102 adjacent the front end of the plenum to the exit 104 adjacent the rear end of the plenum. The post-combustion plenum 100 includes a bottom wall dividing the combustion chamber 50 from the plenum, side walls extending up from the bottom wall, and a top wall spanning the side walls. The construction provides the plenum 100 with a generally rectangular cross section. The post-combustion plenum 100 has six sides, namely a front side, a rear side, a top side, a bottom side, a left side, and a right side. The post-combustion plenum 100 has a length extending between the front and rear sides, a width extending between the left and right sides, and a height extending between the top and bottom sides. As the products of combustion flow through the plenum 100, they flow along the side and top walls of the plenum from the front side of the plenum toward the rear side of the plenum. Downstream from the heat transfer device 42, the products of combustion exit the housing 22 via the exit 104 in the rear wall 30 of the housing 22, to which a chimney (not shown) may be connected.

The heat transfer passaging 106 of the heat transfer device 42 includes several passage portions extending along the post-combustion plenum. As described in further detail below, the heat transfer passaging 106 includes two side passage portions 106A, a forward passage portion 106B, and an upper passage portion 106C. In the illustrated embodiment, the heat transfer passaging 106 extends across substantially all of the top, left, and right sides of the post-combustion plenum 100 (three of the six sides) for efficient heat transfer over a large surface area. The two side passage portions 106A (broadly, first passage portions) are on the respective left and right sides of the post-combustion plenum 100 and extend lengthwise along the left and right sides toward the front side. The side passage portions 106A receive air from the respective ducts 124. Air in the side passage portions 106A flows forward toward the front side of the post-combustion plenum. The forward passage portion 106B (broadly, third passage portion) is on the front side of the post-combustion plenum 100 and extends widthwise along the front side. The forward passage portion 106B is downstream from and receives air from both of the side passage portions 106A. Air in the forward passage portion 106B flows generally widthwise along the front side of the post-combustion plenum 100, inward from the opposite side passage portions 106A toward a middle of the forward passage portion. The upper passage portion 106C (broadly, second passage portion) is on the top side of the post-combustion plenum 100 and extends lengthwise along the top side toward the rear side. Air in the upper passage portion 106C flows toward the rear side of the post-combustion plenum. Ultimately, the heated air exits the upper passage portion through one or more exits 140 (FIG. 1). In the illustrated example, two exits 140 in the form of circular openings (e.g., each having an 8 inch diameter) are provided in the upper wall 24 of the housing 22 to which the ducts 110B can be connected. Routing the heat transfer passaging 106 along substantially all of three sides of six sides of the post-combustion plenum 100 provides increased efficiency in heat transfer from the products of combustion to the air passing through the heat transfer passaging 106. For example, air entering the heat transfer passaging 106 may have a temperature of about 75 degrees F., and air exiting the heat transfer passaging may have a temperature of about 230 degrees F.

The forced-air system 120 and the heat transfer passaging 106 are configured to provide a generally constant speed air flow through the furnace 20. This has been found to improve efficiency of heat transfer. For example, the side ducts 124 are sized to have a cross-sectional flow area (e.g., 30 square inches) about half the flow area of the inlet 128 (about 60 square inches). The air flowing upward along the ducts 124 is insulated from the combustion chamber 50 so the air flow speed does not increase significantly. As shown in FIG. 11, the side passage portions 106A have side wall partitions 144 shared with the upper passage portion 106C. The side wall partitions 144 taper inward toward the front side of the post-combustion plenum. The construction is such that the side wall partitions 144 provide the side passage portions 106A with increasing downstream flow area along the flow path of the side passage portions. The key-shaped exits of the side passage portions (FIG. 11) have greater flow areas (e.g., about 30.1 square inches, totaling about 60.2 square inches) than the side ducts 124. Heat transfer occurs in the side passage portions 106A, so the increase in flow area assists in maintaining a generally constant speed air flow. The exit of the forward passage portion 106B has a slightly greater flow area (about 60.3 square inches). The side wall partitions 144 provide the upper passage portion 106C with increasing downstream flow area along the rearward flow path of the upper passage portion. The exits 140 (FIG. 1) from the upper passage portion 106C have a combined flow area (e.g., about 100.5 square inches), to provide increased flow area. It will be appreciated that as air in the heat transfer passaging 106 is heated, the air will tend to flow faster. However, the increasing downstream flow area of the heat transfer passaging 106 assists in providing a generally constant speed air flow through the heat transfer passaging, which has been found to provide increased efficiency in heat transfer. In total, the forced-air blower path through the furnace 20 is constructed to provide quasi-constant low speeds, to optimize heat transfer, while not removing heat in areas (e.g., the ducts 124) that would compromise efficiency of combustion in the combustion chamber 50.

The furnace 20 includes various electrical components for controlling operation of the furnace. In particular, the furnace 20 includes a main electrical control 150 and a blower limit switch 152. The main electrical control 150 is mounted on the control housing 35 and is connectable to a power source such as an electrical outlet or generator. The main electrical control 150 is adapted for communication with a thermostat (not shown) located within the space to be heated. The blower limit switch 152 (FIG. 4) includes a probe 152A (FIGS. 10, 11) positioned in the right side passage portion. The blower limit switch 152 senses temperature within the right side passage portion 106A via the probe 152A and communicates this information to the main electrical control 150 so that the main electrical control can selectively energize and de-energize the blower 46.

In operation, a fuel source such as wood is loaded in the combustion chamber 50, and the fuel is ignited. When the thermostat in the space to be heated calls for heat, the main electrical control 150 causes the draft blower 44 to energize (forced draft mode), forcing oxygen out of the primary combustion air outlet 76 to feed the fire in the combustion chamber 50. As temperature rises in the combustion chamber 50, the valve system 81 will permit increased secondary combustion air flow to the combustion chamber. When the blower limit switch 152 senses a preselected hot air temperature (e.g., 170° F.) within the right side passage portion 106A, the main electrical control 150 causes the blower 46 to energize to force the heated air to the space being heated and draw replacement air into the furnace. If the blower limit switch 152 senses a preselected cool air temperature (e.g., 110° F.) within the heated air plenum 50B, the main electrical control 150 de-energizes the blower 46 until the blower limit switch 152 again senses the preselected hot air temperature in the right side passage portion 106A. When the thermostat senses sufficient heat in the space being heated, the main electrical control 150 de-energizes the draft blower 44, decreasing oxygen to the fire to decrease heated air generation in the furnace 20. However, combustion air is still delivered to the fire through the primary combustion air outlet 76 by natural draft. As temperature decreases in the combustion chamber 50, the valve system 81 permits decreased secondary combustion air flow via the outlet 82.

The furnace 20 may be used as a sole source for heating the interior of a building or a plurality of rooms of a building. The large size of the combustion chamber 50, in combination with various other features of the furnace described above, provide the furnace with the capability of providing a significantly large amount of heat with good efficiency and significantly lower emissions of particulates and carbon monoxide.

It will be appreciated various aspects of the furnace described herein can be modified. For example, features can be omitted or have other forms. Moreover, it will be appreciated that the dimensions noted herein are provided by way of example and not as a limitation.

Having described the disclosure in detail, it will be apparent that modifications and variations are possible without departing from the scope of the appended claims.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the disclosure, it is intended that all matter contained in the above description and shown in the accompanying drawings shall be interpreted as illustrative and not in a limiting sense.

What is claimed is:

1. A forced-air furnace for heating a space, the furnace comprising:
   a housing having a top, bottom, front, rear, and opposite sides;
   a firebox in the housing having a combustion chamber adapted for receiving and burning fuel to produce heated products of combustion;
   a combustion air delivery system for delivering combustion air to the combustion chamber, the combustion air delivery system including:
      a primary combustion air passage including a primary combustion air outlet in the combustion chamber for delivering primary combustion air to the combustion chamber at a primary combustion air flow rate,
      a secondary combustion air passage including a secondary combustion air outlet positioned above the primary combustion air outlet in the combustion chamber for delivering secondary combustion air to the combustion chamber at a secondary combustion air flow rate, and
   a valve system fluidly isolated from the first combustion air passage and in fluid communication with the secondary combustion air passage, said valve system being configured for changing the secondary combustion air flow rate delivered to the combustion chamber in response to a change in combustion chamber temperature without changing the primary combustion air flow rate delivered to the combustion chamber; and
   a heat transfer device above the firebox including a post-combustion plenum having an inlet in fluid communication with the combustion chamber for receiving products of combustion therefrom and an exit for permitting products of combustion to exit the post-combustion plenum, the post-combustion plenum having a front side, a rear side opposite the front side, a top side, and a length extending between the front side and the rear side, wherein the heat transfer device includes heat transfer passaging adapted for transporting air to be heated by the post-combustion plenum, the heat transfer passaging including:
      a first passage portion extending lengthwise relative to the post-combustion plenum, extending adjacent to the post-combustion plenum and configured for directing air in a direction toward the front side of the post-combustion plenum, said first passage portion being partially defined by a first wall; and
      a second passage portion downstream from the first passage portion extending lengthwise relative to the post-combustion plenum defining a flow path extending adjacent the post-combustion plenum and configured for directing air in a direction toward the rear side of the post-combustion plenum, said second passage portion being partially defined by a second wall comprising at least a portion of the top side of the post-combustion plenum.

2. A forced-air furnace as set forth in claim 1, wherein the valve system is configured to increase the secondary combustion air flow rate delivered to the combustion chamber in response to an increase in combustion chamber temperature.

3. A forced-air furnace as set forth in claim 2, wherein the valve system is configured to decrease the secondary combustion air flow rate delivered to the combustion chamber in response to a decrease in combustion chamber temperature.

4. A forced-air furnace as set forth in claim 1, wherein the valve system is free of an electronic control for the valve.

5. A forced-air furnace as set forth in claim 1, wherein the valve system includes a valve member and a temperature responsive valve actuator, the valve member being movable by the temperature responsive valve actuator in response to a change in combustion chamber temperature to change the secondary combustion air flow rate delivered to the combustion chamber.

6. A forced-air furnace as set forth in claim 5, wherein the temperature responsive valve actuator comprises a bi-metal member.

7. A forced-air furnace as set forth in claim 5, wherein the temperature responsive valve actuator is located outside the combustion chamber thereby indirectly sensing the combustion chamber temperature.

8. A forced-air furnace as set forth in claim 1, wherein the valve system comprises a valve member mounted for movement between an open position and a closed position, and the combustion air delivery system is configured to permit air to flow to the combustion chamber via the secondary combustion air passage when the valve member is in the closed position.

9. A forced-air furnace as set forth in claim 1, wherein the combustion air delivery system is configured to independently control the primary and secondary combustion air flow rates delivered to the combustion chamber.

10. A forced-air furnace as set forth in claim 1, wherein the combustion air delivery system is configured to draw secondary combustion air through the secondary combustion air passage via natural draft.

11. A forced-air furnace as set forth in claim 1, wherein the heat transfer passaging includes a third passage portion at the front side of the post-combustion chamber, the third passage portion being in fluid communication with and downstream from the first passage portion and in fluid communication with and upstream from the second passage portion.

12. A forced-air furnace as set forth in claim 1, wherein:
   the post-combustion plenum has six sides including said top side, a bottom side, a left side, a right side, said front side, and said rear side; and
   the heat transfer passaging extends across substantially all of at least two of said six sides of the post-combustion plenum.

13. A forced-air furnace as set forth in claim 1, wherein said first wall comprises at least a portion of at least one of the left side and the right side of the post-combustion plenum.

* * * * *